20
UNITED STATES PATENT OFFICE.

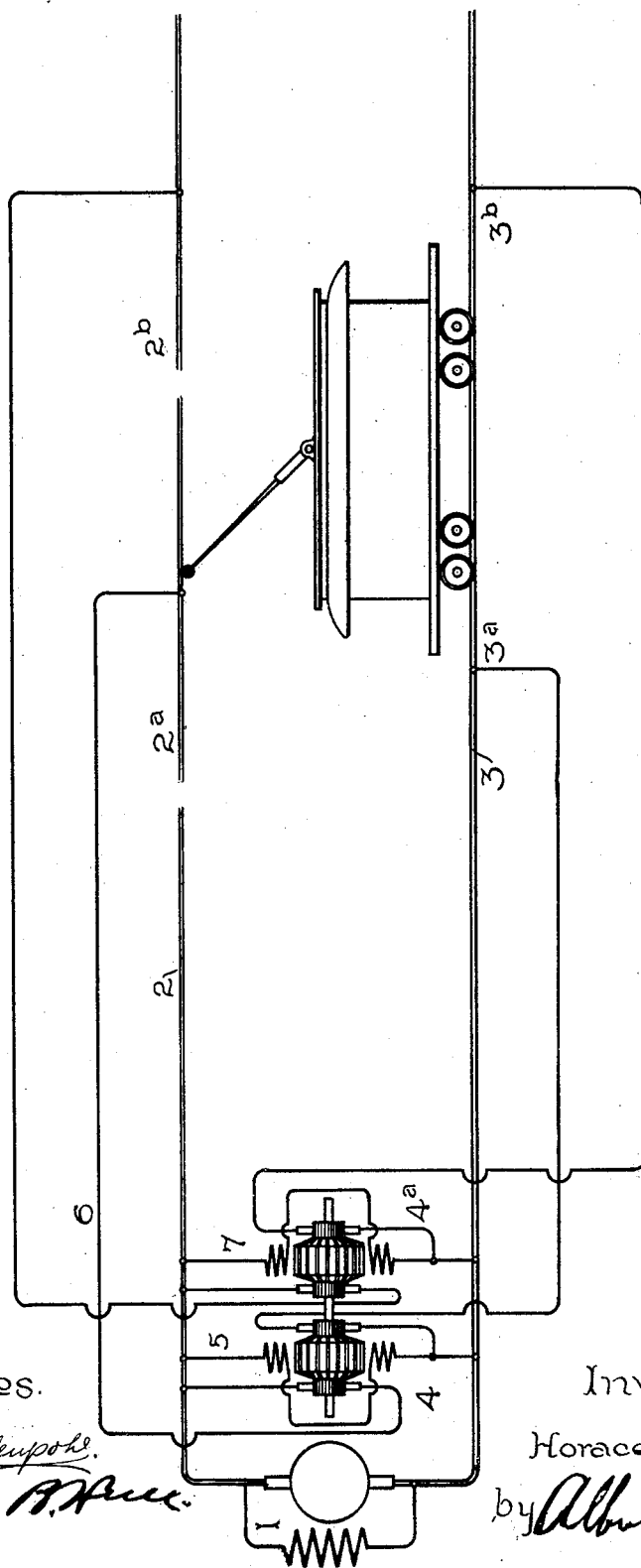

HORACE F. PARSHALL, OF LONDON, ENGLAND, ASSIGNOR TO THE GENERAL ELECTRIC COMPANY, A CORPORATION OF NEW YORK.

SYSTEM OF ELECTRIC DISTRIBUTION.

SPECIFICATION forming part of Letters Patent No. 706,591, dated August 12, 1902.

Application filed December 7, 1899. Serial No. 739,487. (No model.)

*To all whom it may concern:*

Be it known that I, HORACE F. PARSHALL, a citizen of the United States, residing at London, England, have invented certain new and useful Improvements in Systems of Electric Distribution, (Case No. 1,057,) of which the following is a specification.

My invention relates to systems of electrical distribution of the kind in which one side of the circuit is earthed, and is particularly applicable to electric-railway systems, its object being to obviate the damage due to the electrolytic effects of the earth-currents returning to the generator-station by other paths than the rails or return-conductor.

An electrolytic or corrosive action upon metallic pipes or other metallic bodies buried in the ground in the neighborhood of an electric railway follows from a difference of potential of different parts of the earth-circuit. This results in currents flowing in the earth from points where the highest potential exists. Any metallic objects lying in the path of such currents are subject to corrosive action, which during a period of long continuance creates much damage. I obviate these objectionable results by establishing in the various railway-sections corresponding to the several feeders of the system an assisting electromotive force tending to prevent the dispersion of the currents through the earth by establishing what might be regarded as a negative potential at the rails in the several track-sections, thereby establishing a condition which might be loosely described as an "electric suction" in the metallic path leading to the distributing-station. I accomplish this result by installing at the distributing-station one or more electromotive devices preferably corresponding in number to the number of feeder-sections in the system and connected by independent conductors with the rails or return-circuit at points of the track varying in distance from the distributing center. I preferably employ an electromotive device for this purpose which may be driven by the same source which supplies the system and which in effect is a motor-generator having two independent armature and field-magnet windings, one pair acting as a motor and the other as a generator or booster. One set of these armature-windings in the several electromotive devices has one terminal connected to the several trolley-supply sections and the other to a generator-lead close to the station. The other set of armature-windings has each one terminal connected with earth at the distributing-station, the other with the rails or return-conductor at points varying in distance from the station. Thus the electromotive devices have their driving members operated under a voltage varying with the distance of the point protected and their driven members supplied with an assisting electromotive force varying in a corresponding way.

The range of potential of the return-circuit above or below that of the earth connection at the station existing at different points of the system is in many places regulated by rules established by boards of trade or other authorities. This voltage is always low, amounting to only a few volts. It is evident that with such low pressure in view of the excellent conductivity of the metallic return-circuit provided but a small proportion of the current will leak to earth and be a possible source of damage to intervening pipes or metallic structures.

The invention comprises one or more motor-generators preferably located at the distributing-station, each motor operating under a constant field and having its armature operated at a voltage proportionate to the distance from the station of the point to be protected and having its generating boosting-winding connected with the return-circuit at such point as to divert the earth-currents and to assist their flow back to the station through a metallic path.

Several other features of novelty will be more fully described hereinafter and will be definitely indicated in the claims.

In the annexed diagram, which illustrates a system embodying my improvements, 1 represents an electric generator, and 2 $2^a$ $2^b$ sections of the supply-conductor located at varying distances from the generating-station. These sections are of course connected with feeders leading from the generator in a manner which is universal in practice.

3 represents the return-circuit, which may be the track-rails or other metallic conductor or path. In practice different parts of this conductor have sufficient potential to cause leakage-currents through the earth back to the generator-station. I obviate this by connecting at different distances from the station auxiliary, preferably insulated, return-conductors, as at the points $3^a$ $3^b$, in which I create an assisting electromotive force tending to create at such points a relative potential such as to shunt the stray currents from the earth. The type of electromotive device I have shown embodies a motor-generator 4 $4^a$, provided with independent field-magnet windings which may be connected between the generator and earth, as shown. The motor-winding 5 of the generator connects with the line side of the main generator 1 at one terminal and at the other terminal with a feeder 6, leading to one of the trolley-sections, as $2^a$ or $2^b$. This may be the main feeder of the section or an auxiliary one. Thus the current flowing in the motor-armature is the same as that in the feeder-section, which it protects, and the assisting electromotive force of its generating-winding 7 will correspondingly vary. This winding has one terminal connected to ground at the distributing-station and the other terminal connected with the return-circuit, as the rails, at the point protected. As many of these auxiliary devices as there are current-feeders for the system may be provided.

While the organization which I have described is preferable because the assisting electromotive force furnished by the motor-generators corresponds to the exigencies and changing conditions of the neighborhoods protected, still more or less good results might be obtained by graduating the assisting electromotive force in other ways.

In operation any local conditions which affect the relation between the return-conductor and earth at a given point correspondingly affect its electromotive device, and thereby graduate the assisting electromotive force accordingly. The potential existing at a point $3^a$ or $3^b$ is thus neutralized. Thus the protecting device creates, as it were, a negative resistance in the branch in which it is inserted and encourages the stray currents to follow that path in preference to the higher resistance through the earth.

What I claim as new, and desire to secure by Letters Patent of the United States, is—

1. A system of electrical distribution, comprising a generator, a booster, and a motor driving the booster, said motor having a constant-field magnet, and an armature-current fluctuating with the load on the system.

2. A system of electrical distribution, comprising a generator, a feeder, a motor having an armature in the feeder branch, a field-magnet circuit independent of the feeder branch, and a booster operated by said motor.

3. A system of electrical distribution, having its translating devices fed through a ground branch or earth-return and including metallic return-paths connecting with the return-feeder at different distances from the distributing-point, a motor having a constant-field magnet, an armature in the feeder branch, and a booster driven by the motor in a metallic return-path.

4. A system of electrical distribution, having its translating devices fed through a ground branch or earth-return, and including metallic return-paths connecting with the return-conductor at different distances from the distributing-point, a plurality of boosters connected in the several metallic return-paths, and motors for driving said boosters, having constant-field magnets and armatures in circuit with the several feeders, for the purpose described.

In witness whereof I have hereunto set my hand this 4th day of December, 1899.

HORACE F. PARSHALL.

Witnesses:
BENJAMIN B. HULL,
MABEL E. JACOBSON.